US007975135B2

(12) United States Patent
Reeves et al.

(10) Patent No.: US 7,975,135 B2
(45) Date of Patent: Jul. 5, 2011

(54) APPARATUS, METHOD AND PRODUCT FOR SELECTING AN ISCSI TARGET FOR AUTOMATED INITIATOR BOOTING

(75) Inventors: Drue Reeves, Round Rock, TX (US); Matthew W Baker, Austin, TX (US); Eric Endebrock, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 609 days.

(21) Appl. No.: 11/563,024

(22) Filed: Nov. 23, 2006

(65) Prior Publication Data

US 2008/0201570 A1 Aug. 21, 2008

(51) Int. Cl.
*G06F 15/177* (2006.01)
(52) U.S. Cl. ............................................................ 713/2
(58) Field of Classification Search .................. 713/1, 2
See application file for complete search history.

(56) References Cited

U.S. PATENT DOCUMENTS

| 7,093,120 | B2 * | 8/2006 | Keohane et al. ................... 713/2 |
| 7,234,053 | B1 * | 6/2007 | Mahmoud ........................ 713/2 |
| 7,353,542 | B2 * | 4/2008 | Shiga et al. ...................... 726/28 |
| 7,533,190 | B2 * | 5/2009 | Lerner et al. ................... 709/250 |
| 2003/0126242 | A1 * | 7/2003 | Chang ........................... 709/222 |
| 2003/0191623 | A1 | 10/2003 | Salmonsen |
| 2004/0078679 | A1 | 4/2004 | Cagle et al. |
| 2005/0138346 | A1 * | 6/2005 | Cauthron ........................ 713/2 |
| 2005/0149924 | A1 | 7/2005 | Komarla et al. |
| 2005/0228950 | A1 | 10/2005 | Karr |
| 2005/0257274 | A1 | 11/2005 | Shiga et al. |
| 2006/0075470 | A1 | 4/2006 | Tanaka et al. |
| 2006/0218388 | A1 * | 9/2006 | Zur et al. ........................ 713/2 |

* cited by examiner

*Primary Examiner* — Thomas Lee
*Assistant Examiner* — Eric Chang
(74) *Attorney, Agent, or Firm* — Garrana Tran LLP; Andrea E. Tran

(57) ABSTRACT

An apparatus, method and product for selecting an iSCSI target for us in automatically booting a remote initiator is disclosed. A policy engine is created for use in a discovery domain of an iSCSI device. A boot attribute setting within the policy engine is set for selecting an iSCSI target to allow the remote initiator to automatically log onto the selected target for booting.

20 Claims, 4 Drawing Sheets

APPARATUS, METHOD AND PRODUCT FOR SELECTING AN iSCSI TARGET FOR AUTOMATED INITIATOR BOOTING

BACKGROUND

1. Technical Field

The present disclosure relates generally to information handling systems and, more particularly, to network devices.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of several aspects of the disclosure and is not an extensive overview of the disclosure. It is not intended to identify key or critical elements of the disclosure or to delineate the scope of the claims. The following summary merely presents some concepts of the disclosure in a general form as a prelude to the more detailed description that follows.

A method for selecting an iSCSI target for use in automatically booting an initiator is disclosed. The method may include providing a boot attribute setting within a policy engine for one or more iSCSI targets, the boot attribute setting being used for selecting at least one of the one or more iSCSI targets, the policy engine allowing a remote initiator to automatically log onto the selected iSCSI target for booting.

An information handling system is disclosed that includes a memory device having stored therein information that comprises a policy engine, the memory device being accessible by a discovery service, wherein the policy engine includes an attribute for identifying an iSCSI target as a boot target, the policy engine allowing a remote initiator to boot using the boot target.

A computer-readable medium is disclosed having instructions stored thereon that when executed causes a computer to execute a method including using a boot attribute setting within a policy engine for one or more iSCSI targets to select at least one of the one or more iSCSI targets, the policy engine allowing a remote initiator to automatically log onto the selected iSCSI target for booting.

Another aspect of the present disclosure provides for a method for automatically booting an initiator in an information handling system (IHS). The method may include providing a boot attribute within a policy engine in the IHS. The boot attribute is operable to be set for an iSCSI target thereby designating the iSCSI target as a boot target. The method may also include querying a target set for one or more iSCSI targets for which the boot attribute is set and booting a remote initiator from the one or more iSCSI targets.

A further aspect of the present disclosure provides for an information handling system (IHS). The IHS may include a remote initiator and a memory device having stored therein information that comprises a policy engine, wherein the policy engine includes a boot attribute operable to be set for an iSCSI target, thereby designating the iSCSI target as a boot target. The IHS may further include a discovery service in communication with the remote initiator and the policy engine. The discovery service is configured to return to the remote initiator one or more iSCSI targets for which the boot attribute is set, and the remote initiator boots from the one or more iSCSI targets.

Yet another aspect of the present disclosure provides for a computer readable medium having instructions stored thereon that when executed causes a computer to execute a method. The method may include registering a remote initiator with a discovery service, the discovery service operable to return to the remote initiator one or more iSCSI targets for which a boot attribute is set. The boot attribute designates the one or more iSCSI targets as a boot target. The method may also include booting the remote initiator from the one or more iSCSI targets.

BRIEF DESCRIPTION OF THE DRAWINGS

For detailed understanding of the present disclosure, references should be made to the following detailed description of the several embodiments, taken in conjunction with the accompanying drawings, in which like elements have been given like numerals and wherein.

DETAILED DESCRIPTION

For purposes of this disclosure, an information handling system may include, but is not limited to, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Portions of the present disclosure, detailed description and claims may be presented in terms of logic, software or software implemented aspects typically encoded on a variety of media including, but not limited to, computer-readable media, machine-readable media, program storage media or computer program product. Such media may be handled, read, sensed and/or interpreted by an information handling system (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 1:
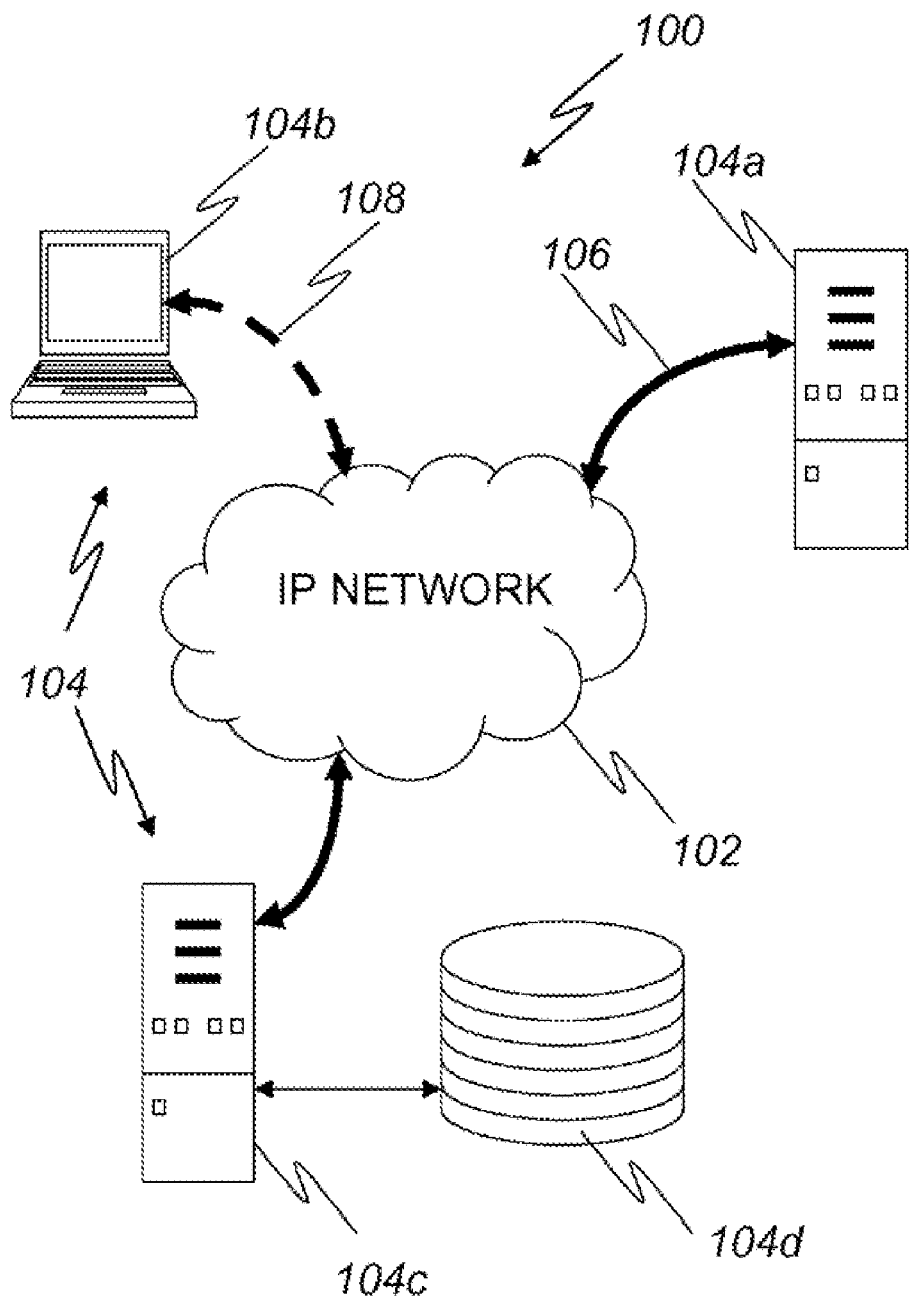
FIG. 1 schematically illustrates a non-limiting example of a system according to the disclosure.

FIG. 1 schematically illustrates a non-limiting example of an information handling system 100 comprising several IHS devices 104 communicating over an internet protocol (IP) network 102. In several non-limiting embodiments, the devices 104 may include any IHS; non-limiting examples include computers 104a, laptops 104b, servers 104c and/or tape libraries and arrayed discs such as redundant array of independent disks, also known as redundant array of inexpensive disks (RAID) 104d. The devices 104 shown are presented for illustration and not by way of limiting the scope of the disclosure.

In one non-limiting embodiment, the devices include one or more Internet Small Computer System Interface (iSCSI) devices such as iSCSI initiator devices and iSCSI target devices. The disclosure also contemplates the use of iSCSI servers, iSCSI tape libraries, iSCSI RAID memory devices and any other device suitable for iSCSI communication over an IP Network 102.

For the purposes of the disclosure, an iSCSI target includes a device on a storage-device side of a communication link using an iSCSI protocol. The communication link may be, for example, wired 106 or wireless 108. An initiator, as used herein, includes an iSCSI initiator device that requests data transfers from iSCSI targets. The iSCSI targets include, but are not limited to, disk-drives, tape-drives, optical, and/or other media devices. A remote initiator, as used herein, means an initiator device located apart from one or more targets. A remote initiator may communicate with the targets over a communication link as described herein. For the purposes of the disclosure, any reference to an initiator means a remote initiator unless otherwise noted.

The iSCSI protocol enables block storage applications over TCP/IP networks using architecture based on a client/server model. The client may be, but is not limited to, a host system such as file server that issues requests to read or write data. The server may be, but is not limited to, a resource such as a disk array that responds to client requests.

A target such as an iSCSI target may be one of several logical units that process initiator commands. Logical units are assigned identifying logical unit numbers (LUNs). At times, a target may be referred to as a LUN and/or a LUN may be referred to as a target.

In one non-limiting embodiment, a device such as a server may be booted over a network without a disk or image residing on the server to be booted. For the present disclosure, a discovery service is a tool to allow an initiator to discover a target such as storage. In one non-limiting embodiment, a discovery service may be an internet Storage Naming Service (iSNS) used to create relationships between storage initiators (e.g., clients) and targets (e.g. servers).

In one non-limiting embodiment, a discovery service includes an iSNS for configuration information. An attribute process is then used to identify targets as boot targets so that an iSCSI initiator may request that it boot from the network. As will be described in more detail later with respect to methods disclosed, the initiator discovers via this central management space within the iSNS server(s), which target (may be one or one of several or several targets) of the myriad targets is or are available for booting. The initiator then selects the target and boots automatically without requiring any configuration of the target information on the client. In one non-limiting embodiment, the target configuration information may be stored centrally in a discovery domain (DD). This allows one to potentially reconfigure the target information to automatically point the server from one target (image) to another.

Figure 2:
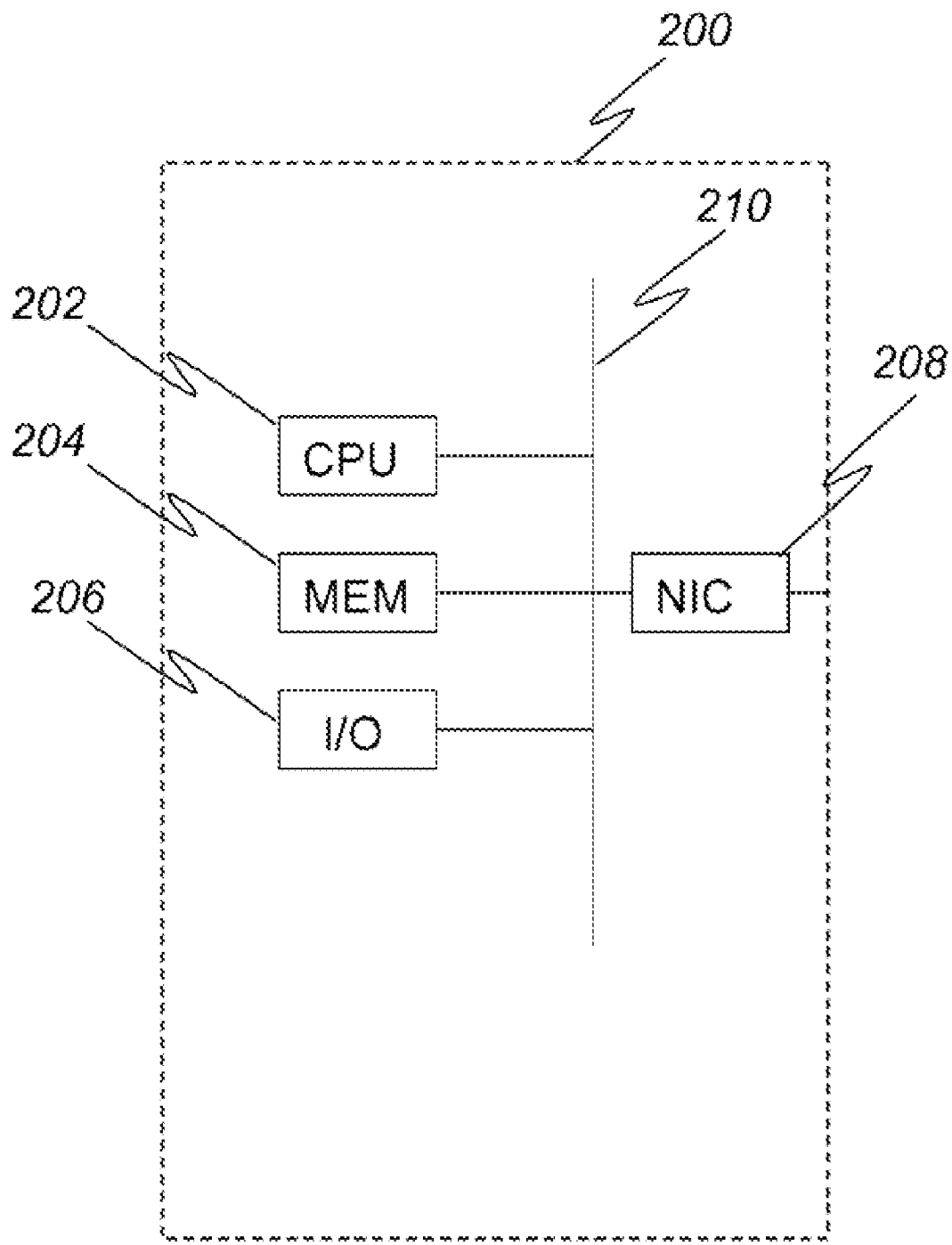
FIG. 2 schematically illustrates a non-limiting example of a server device.

FIG. 2 illustrates a non-limiting embodiment of an iSCSI device 200. In one non-limiting embodiment the device 200 comprises a server device including a central processing unit 202, a memory 204, one or more input/output (I/O) devices 206 and a network interface card (NIC) 208 communicating over a device bus 210.

In one non-limiting embodiment, a policy engine may be stored in the memory 204 or in a central repository. In several non-limiting embodiments, the memory storing the policy engine may be part of the iSNS server, or Lightweight Directory Access Protocol (LDAP) identity management system or in a relational database. The policy engine is used to create relationships between initiators and targets. These relationships are absorbed by the iSNS server or discovery service that may be used to create discovery domains or to assign boot attributes to LUNs. The policy engine, discovery domain, discovery service and targets may be disposed together or separately in any suitable IHS device or combination of IHS devices. The policy engine may include one or more attributes such as a BootDevice attribute to define a particular target as a boot device. The policy engine may further contain attributes to allow particular initiators or classes of initiators to use the boot target for booting over the iSCSI communication link.

Figure 3:
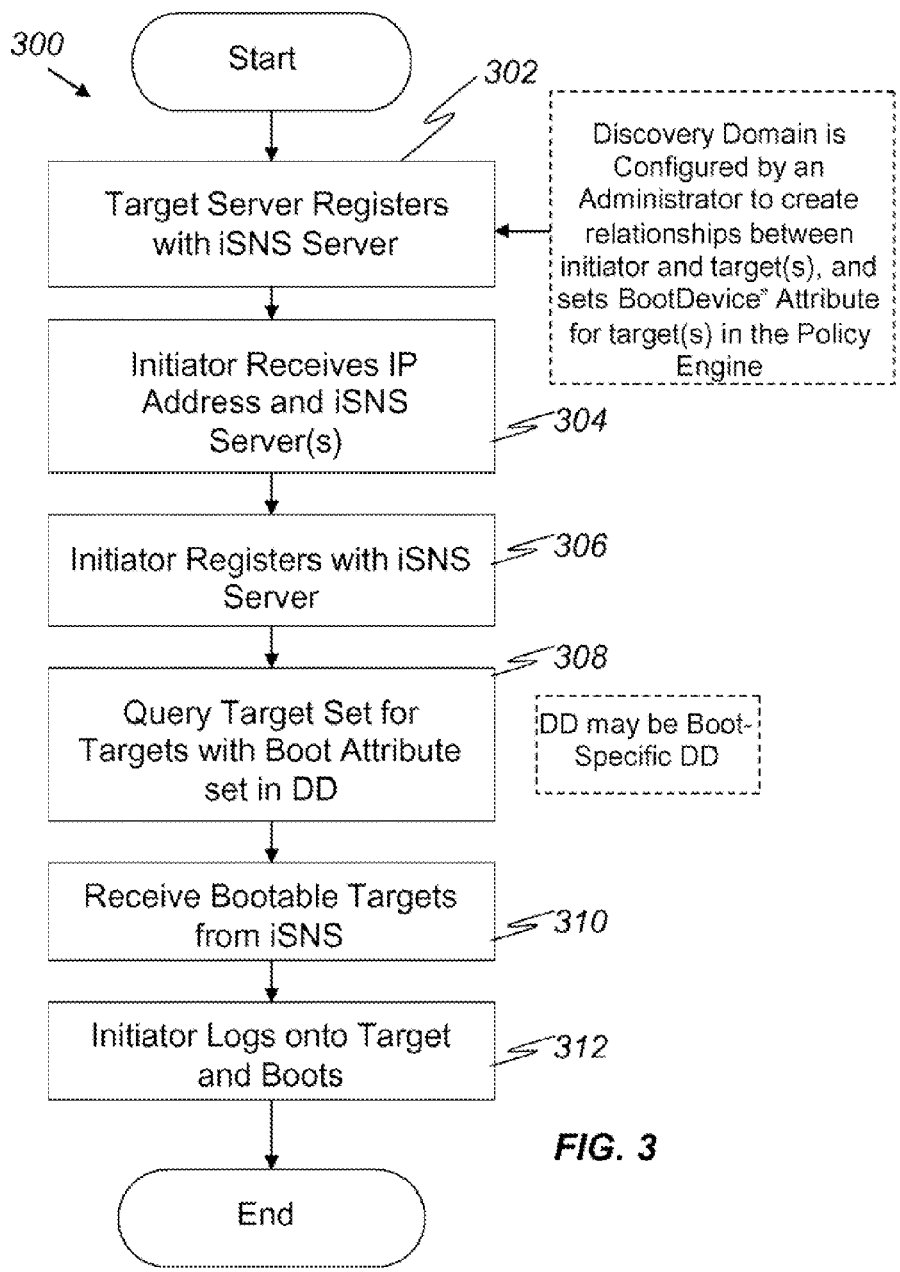
FIG. 3 is a flow chart that illustrates a non-limiting example of a method according to the disclosure.

FIG. 3 is a non-limiting example of a method 300 for automatic booting over an iSCSI communication link. A target registers with a server 302. In one non-limiting embodiment, the server may be a discovery service such as an iSNS server. The server includes a discovery domain, which is configured by an administrator. The policy engine creates relationships between an initiator and a target or several targets. The discovery domain includes a "BootDevice" attribute set for those targets designated as boot targets. In one non-limiting example, the policy engine may include a database. In another non-limiting example, the policy engine comprises a directory service.

An initiator receives an IP address and the iSNS server(s) address(es) 304 by using an appropriate protocol, non-limiting examples of which are Bootstrap Protocol (BOOTP) and/or a Dynamic Host Configuration Protocol (DHCP). The DHCP returns the IP address and iSNS server address(es), and the initiator may then register with the iSNS server 306. The initiator requests target information and queries the target set 308 for targets having a boot attribute ("BootDevice") set in the target discovery domain. The target information for bootable targets may also reside in one or more boot-specific discovery domains.

The iSNS server returns 310 to the initiator all targets in common discovery domains and/or responds to the initiator with specified targets with the boot attribute from the policy engine.

The initiator then logs onto the selected boot target or targets and boots automatically using the boot target or target(s) 312.

Figure 4:
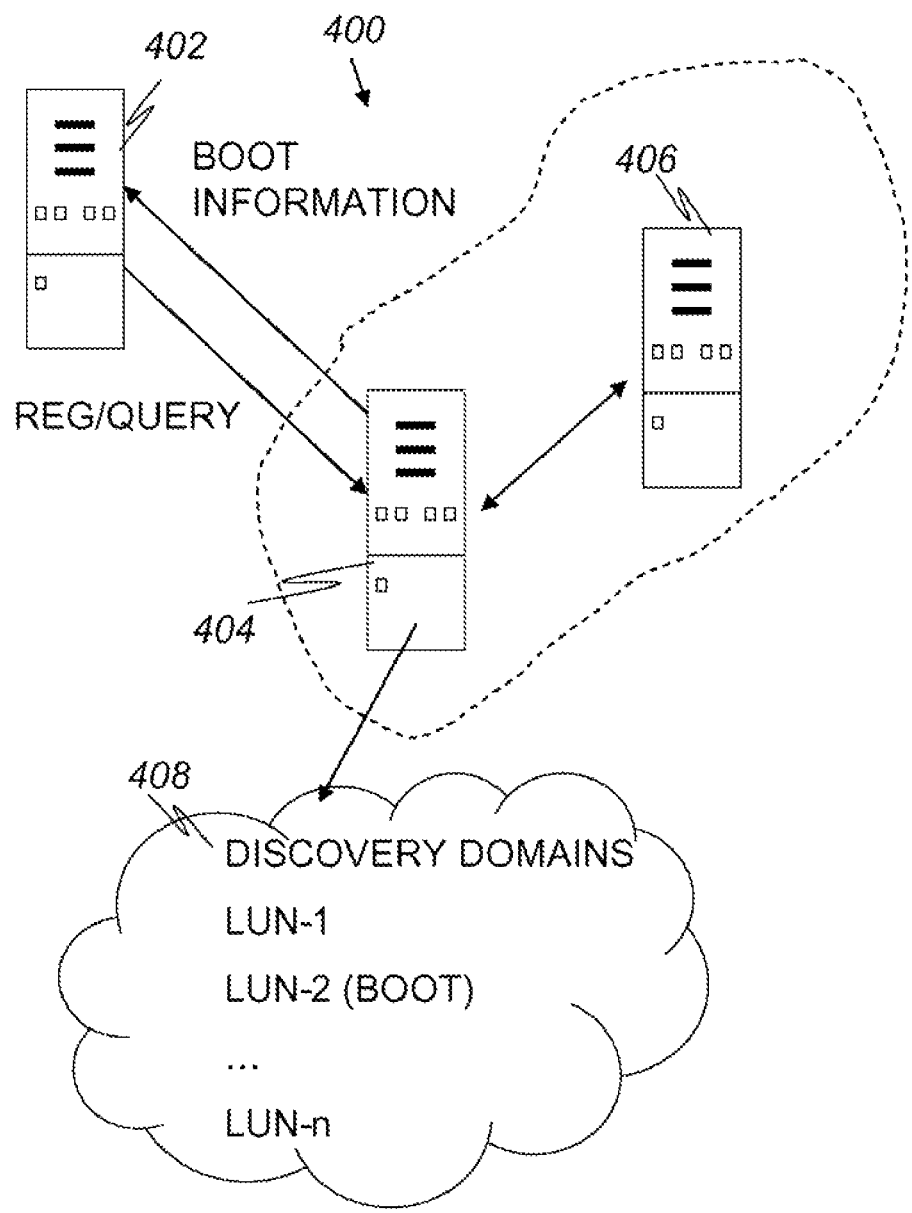
FIG. 4 illustrates a non-limiting example of a system according to the disclosure.

FIG. 4 is another non-limiting illustration of a system 400 for automatically booting an initiator device 402 over an IP network using iSCSI protocol and handshake communication with an iSNS server 404. The iSNS server 404 has configured thereon a discovery domain 408 identifying several LUNs. A target device 406 may be predetermined as a boot target or the target device may identify itself as a boot target when registering with the iSNS server 404. The dashed line indicates that the target device 406 may be a component of or co-housed with the iSNS server device 404.

The initiator device 402 registers with the iSNS server 404 and queries the discovery domain for a LUN having a boot attribute. In the example shown, LUN-2 has a boot attribute set. Where the iSNS server 404 policy engine allows the requesting initiator 402 to boot from the selected LUN-2, the handshake communication returns the location of the boot target device 406, and the initiator automatically logs onto the target and boots.

Referring to the above description and to FIGS. 1-4, the disclosure provides a method for selecting an iSCSI target for us in automatically booting an initiator. The method may include creating a policy engine for use in creating a discovery domain of an iSCSI device, providing a boot attribute setting within the policy engine for one or more targets, and selecting a target by setting the boot attribute for the target, the boot attribute allowing a remote initiator device to automatically log onto the selected target for booting. In one non-limiting embodiment, the boot attribute may include a boot-specific discovery domain. In one non-limiting embodiment, the boot attribute may include an attribute within a discovery domain.

The targets are registered with an iSNS server, and the iSNS uses the policy engine to identify the registering target as a boot target and the iSNS server provides the boot attribute. In one non-limiting example, the targets automatically provide the boot attribute upon or during the registration.

In one embodiment, the initiator registers with an iSNS server, the iSNS server using the policy engine to create relationships between the initiators and targets.

In several embodiments, the policy engine may be implemented as a database or as a directory service.

One non-limiting example of the method includes registering a target device with the iSNS server, setting a boot attribute for the target device to create a boot target, receiving a request from an initiator, registering the initiator with the iSNS server, providing the initiator with a target set, querying the target set to locate the boot target, and automatically booting the initiator using the boot target.

An information handling system is disclosed that includes a memory device having stored therein information that comprises a policy engine, the memory device being accessible by a discovery service, wherein the policy engine includes an attribute for identifying a boot target, the policy engine allowing a remote initiator to boot using the boot target.

In alternative embodiments, the memory device may be included in an iSNS server, and the policy engine may be a database and/or a directory service. The target device may also be a storage device. A storage device may be any number of useful devices used for storing information in electronic form on a computer-readable medium. Non-limiting examples include disks, tape drives, flash memory, and ram.

In one embodiment, the information handling system is adapted to receive a registration request from a target device. The target device may automatically provide the boot attribute to the policy engine for identifying the target device as the boot target device. In another non-limiting embodiment, the information handling system may be adapted to receive a registration request from an initiator device.

In one non-limiting embodiment, a computer readable medium having computer-executable instructions stored thereon is disclosed. When executed, the instructions cause a computer to execute a method that includes registering a target device with an iSNS server having a policy engine, setting a boot attribute in the policy engine for the target device to create a boot target, receiving a request from an initiator, registering the initiator with the iSNS server, providing the initiator with a target set, querying the target set to locate the boot target, and providing information to the initiator for automatically booting the initiator using the boot target.

In one non-limiting embodiment, the target device provides the boot attribute to the policy engine during the registration. In another example, the policy engine creates a relationship between the initiator and the target device.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A method for automatically booting a remote initiator associated with an information handling system (IHS), the method comprising:
    providing a boot attribute to a policy engine in the IHS, wherein the boot attribute is operable to be set for an Internet Small Computer System Interface (iSCSI) target thereby designating the iSCSI target as a boot target, and wherein the iSCSI target automatically provides the boot attribute to the policy engine;
    querying the policy engine by the remote initiator for a target set having one or more iSCSI targets for which the boot attribute is set; and
    booting the remote initiator from the one or more iSCSI targets.

2. The method of claim 1 wherein the boot attribute comprises a boot-specific discovery domain.

3. The method of claim 1 wherein the boot attribute comprises an attribute within a discovery domain.

4. The method of claim 1, wherein the one or more iSCSI targets automatically provides the boot attribute when the one or more iSCSI targets registers with an Internet Storage Name Service (iSNS) server, wherein the iSNS server uses the policy engine.

5. The method of claim 4, wherein the one or more iSCSI targets automatically provides the boot attribute when registering with an iSNS server.

6. The method of claim 1 further comprising registering an initiator with an Internet Storage Name Service (iSNS) server, the iSNS server using the policy engine to return information to the initiator.

7. The method of claim 1, wherein the policy engine comprises a database.

8. The method of claim 1, wherein the policy engine comprises a directory service.

9. The method of claim 1 further comprising:
registering the iSCSI target with an Internet Storage Name Service (iSNS) server;
setting the boot attribute for the iSCSI target to create the boot target; and
providing information to the remote initiator for automatically booting the remote initiator using the boot target.

10. An information handling system (IHS) comprising:
a remote initiator;
a memory device having stored therein information that comprises a policy engine, wherein the policy engine includes a boot attribute operable to be set for an Internet Small Computer System Interface (iSCSI) target, thereby designating the iSCSI target as a boot target, and wherein the iSCSI target automatically provides the boot attribute to the policy engine; and
a discovery service in communication with the remote initiator and the policy engine, wherein the discovery service is configured to return to the remote initiator one or more iSCSI targets for which the boot attribute is set, and wherein the remote initiator boots from the one or more iSCSI targets.

11. The system of claim 10, wherein the discovery service comprises an iSNS server.

12. The system of claim 10, wherein the policy engine comprises a database.

13. The system of claim 10, wherein the policy engine comprises a directory service.

14. The system of claim 10, wherein the one or more iSCSI targets is configured to register with the discovery service.

15. The system of claim 14, wherein the one or more iSCSI targets is configured to provide the boot attribute to the policy engine for identifying the one or more iSCSI targets as the boot target.

16. The system of claim 10, wherein the remote initiator is configured to register with the directory service.

17. The system of claim 10, wherein the boot target comprises a storage device.

18. A computer readable storage medium having instructions stored thereon that when executed causes a computer to execute a method comprising:
registering a remote initiator with a discovery service, the discovery service operable to return to the remote initiator one or more Internet Small Computer System Interface (iSCSI) targets for which a boot attribute is set, the one or more iSCSI targets automatically providing the boot attribute, wherein the boot attribute designates the one or more iSCSI targets as a boot target; and
booting the remote initiator from the one or more iSCSI targets.

19. The computer readable storage medium of claim 18, wherein the one or more iSCSI targets provides the boot attribute to a policy engine.

20. The computer readable storage medium of claim 18, wherein the discovery service is an an Internet Storage Name Service (iSNS) server.

* * * * *